(12) United States Patent
Maruo et al.

(10) Patent No.: US 11,999,336 B2
(45) Date of Patent: Jun. 4, 2024

(54) STROKE SIMULATOR AND BRAKE CONTROL APPARATUS

(71) Applicant: Hitachi Astemo, Ltd., Hitachinaka (JP)

(72) Inventors: Ryohei Maruo, Kawasaki (JP); Takahiro Kawakami, Atsugi (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 569 days.

(21) Appl. No.: 17/274,375

(22) PCT Filed: Aug. 5, 2019

(86) PCT No.: PCT/JP2019/030636
§ 371 (c)(1),
(2) Date: Mar. 8, 2021

(87) PCT Pub. No.: WO2020/059325
PCT Pub. Date: Mar. 26, 2020

(65) Prior Publication Data
US 2021/0339724 A1 Nov. 4, 2021

(30) Foreign Application Priority Data

Sep. 18, 2018 (JP) .................................. 2018-173748

(51) Int. Cl.
| | | |
|---|---|---|
| B60T 13/74 | (2006.01) | |
| B60T 7/04 | (2006.01) | |
| B60T 8/40 | (2006.01) | |
| B60T 13/14 | (2006.01) | |
| B60T 13/66 | (2006.01) | |

(52) U.S. Cl.
CPC .............. *B60T 8/409* (2013.01); *B60T 7/042* (2013.01); *B60T 13/142* (2013.01); *B60T 13/662* (2013.01); *B60T 2270/82* (2013.01)

(58) Field of Classification Search
CPC ........ B60T 8/409; B60T 7/042; B60T 13/142; B60T 13/662; B60T 2270/82

USPC ....... 60/545, 553, 556; 303/14, 113.1, 114.1
See application file for complete search history.

(56) References Cited

U.S. PATENT DOCUMENTS

| 7,416,175 | B2 * | 8/2008 | Al-Dahhan | ............. F16F 1/125 |
|---|---|---|---|---|
| | | | | 267/140 |
| 9,283,939 | B2 * | 3/2016 | Kim | ....................... B60T 13/20 |
| 9,487,198 | B2 * | 11/2016 | Kim | ....................... G05G 5/03 |
| 9,845,085 | B2 | 12/2017 | Besier et al. | |
| 2005/0001476 | A1 * | 1/2005 | Kusano | ................... B60T 17/04 |
| | | | | 303/113.4 |

(Continued)

FOREIGN PATENT DOCUMENTS

| DE | 102016220981 A1 * | 4/2018 | ............ B60T 13/66 |
|---|---|---|---|
| DE | 102016220982 A1 * | 4/2018 | |

(Continued)

OTHER PUBLICATIONS

International Search Report (PCT/ISA/210) issued in PCT Application No. PCT/JP2019/030636 dated Oct. 8, 2019 with English translation (five (5) pages).

(Continued)

*Primary Examiner* — Christopher P Schwartz
(74) *Attorney, Agent, or Firm* — Crowell & Moring LLP

(57) ABSTRACT

A stroke simulator is configured in such a manner that an elastic member disposed in a cylinder of the stroke simulator is restricted from being deformed in a radial direction of the cylinder.

12 Claims, 16 Drawing Sheets

(56) References Cited

U.S. PATENT DOCUMENTS

| | | | |
|---|---|---|---|
| 2007/0063594 A1* | 3/2007 | Huynh | H02K 9/00 310/59 |
| 2010/0078989 A1 | 4/2010 | Kato et al. | |
| 2015/0166023 A1* | 6/2015 | Ryu | B60T 7/042 303/3 |

FOREIGN PATENT DOCUMENTS

| | | | |
|---|---|---|---|
| JP | 2009-73478 | A | 4/2009 |
| JP | 2010-83294 | A | 4/2010 |
| JP | 2017-154541 | A | 9/2017 |
| JP | 2018-100018 | A | 6/2018 |
| JP | 2012-76687 | A | 4/2021 |

OTHER PUBLICATIONS

Japanese-language Written Opinion (PCT/ISA/237) issued in PCT Application No. PCT/JP2019/030636 dated Oct. 8, 2019 with English translation (seventeen (17) pages).
Japanese-language Office Action issued in Japanese Application No. 2018-173748 dated Oct. 4, 2022 with English translation (12 pages).

* cited by examiner

FIG. 8A
FIG. 8B
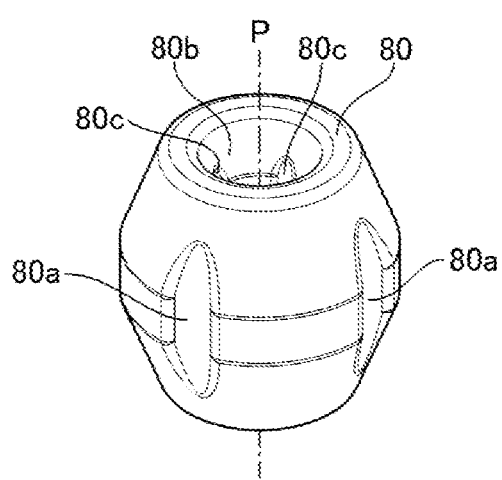
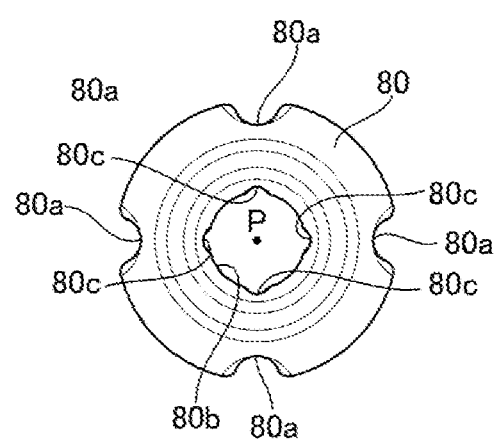

STROKE SIMULATOR AND BRAKE CONTROL APPARATUS

TECHNICAL FIELD

The present invention relates to a stroke simulator and a brake control apparatus.

BACKGROUND ART

PTL 1 discloses a stroke simulator that generates an operation reaction force of a brake pedal with the aid of compression and deformation of an elastic member according to a movement of a piston.

CITATION LIST

Patent Literature

PTL 1: U.S. Pat. No. 9,845,085

SUMMARY OF INVENTION

Technical Problem

The above-described stroke simulator may be unable to acquire an excellent pedal feeling because PTL 1 fails to disclose specific details of the elastic member compressed and deformed according to the movement of the piston at the time of the compression thereof.

Solution to Problem

One of objects of the present invention is to provide a stroke simulator and a brake control apparatus capable of improving a pedal feeling.

According to one aspect of the present invention, a stroke simulator is configured in such a manner that an elastic member disposed in a cylinder is restricted from being deformed in a radial direction of the cylinder.

Therefore, according to the stroke simulator according to the one aspect of the present invention, the excellent pedal feeling can be acquired.

BRIEF DESCRIPTION OF DRAWINGS

FIG. 8A is a perspective view of the rubber damper 80 of the stroke simulator 7 according to the first embodiment, and FIG. 8B is a plan view of the rubber damper 80 of the stroke simulator 7 according to the first embodiment.

DESCRIPTION OF EMBODIMENTS

In the following description, embodiments for implementing the present invention will be described with reference to the drawings.

First Embodiment

First, the configuration will be described.

Figure 1:
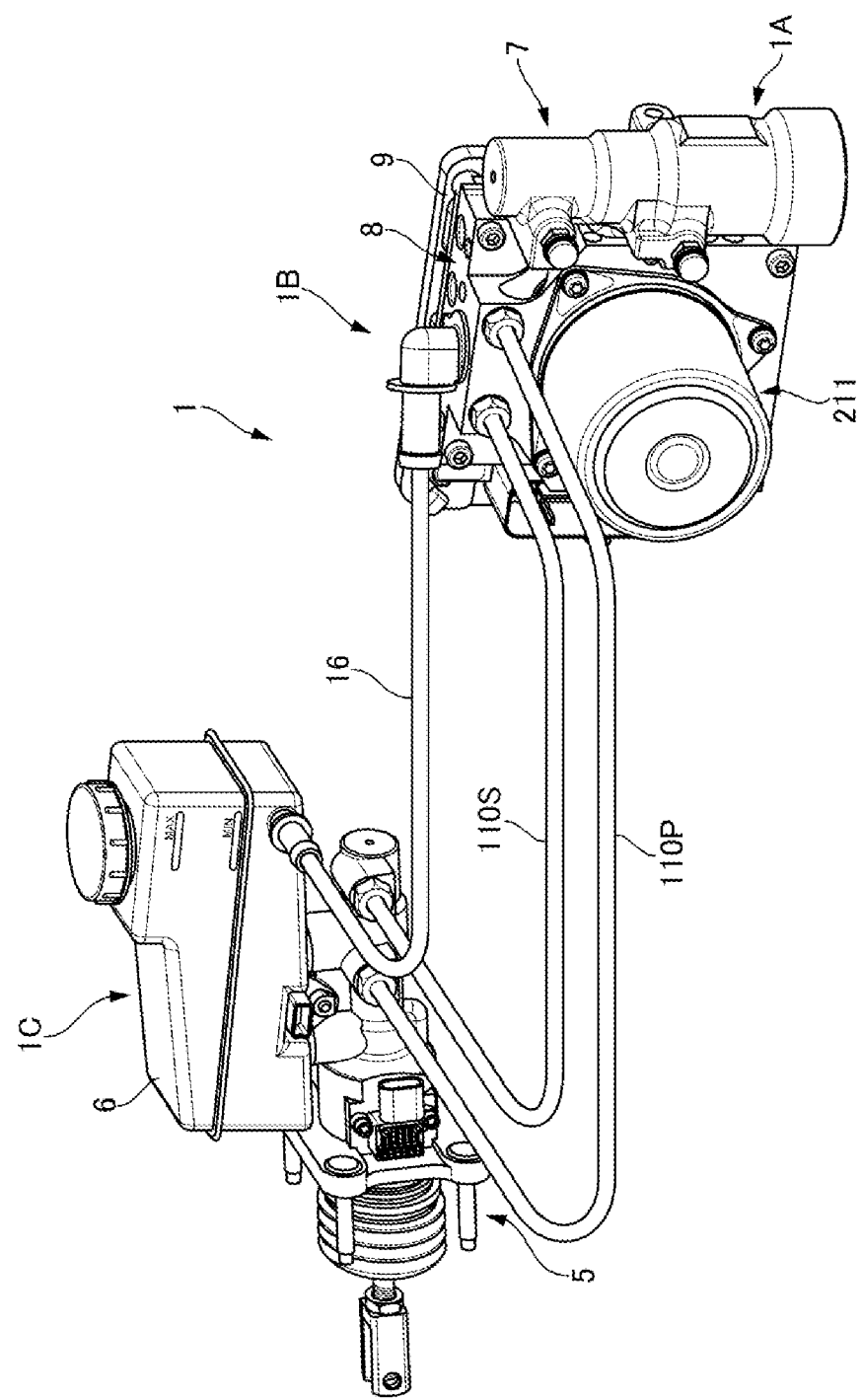
FIG. 1 is a perspective view of a brake apparatus according to a first embodiment.

FIG. 1 is a perspective view of a brake control apparatus 1 according to the first embodiment.

The brake control apparatus 1 includes a first unit 1A, a second unit 1B, and a third unit 1C.

The first unit 1A is a stroke simulator unit including a stroke simulator 7.

The second unit 1B is a hydraulic pressure control apparatus including a hydraulic pressure unit 8 and a control unit 9. The hydraulic pressure unit 8 includes a motor 211 provided between a master cylinder 5 and wheel cylinders 2 of respective wheels (a front left wheel FL, a front right wheel FR, a rear left wheel RL, and a rear right wheel RR). The wheel cylinders 2 are braking force application portions, which will be described below.

The first unit 1A and the second unit 1B are integrally provided and are installed on the vehicle as one unit.

The third unit 1C is a brake operation unit mechanically connected to a brake pedal 3, and is a master cylinder unit including the master cylinder 5 and a reservoir tank 6. The brake pedal 3 is a brake operation member that receives an input of a driver's brake operation, which will be described below.

The third unit 1C is provided as a different unit from the first unit 1A and the second unit 1B, and is installed on the vehicle spatially separately from the first unit 1A and the second unit 1B.

The brake control apparatus 1 includes two brake pipe systems (a primary P system and a secondary S system), and supplies brake fluid working as hydraulic fluid (hydraulic liquid) to each brake actuation unit via brake pipes, thereby generating a hydraulic pressure (a brake hydraulic pressure) in each of the wheel cylinders 2.

By this operation, the brake control apparatus 1 applies a hydraulic braking force to each of the wheels. The pipe configuration is, for example, the X-split pipe configuration. The brake control apparatus 1 may employ another pipe configuration, such as the front/rear split pipe configuration. Hereinafter, when a member provided in correspondence with the P system and a member provided in correspondence with the S system are distinguished from each other, indexes P and S will be added at the ends of the respective reference numerals.

The units 1A to 1C are each set up in, for example, an engine room isolated from a driving compartment of the vehicle, and are connected to each other via master cylinder pipes 110 (a primary pipe 110P and a secondary pipe 110S) and an intake pipe 16.

The master cylinder pipes 110 are each a metallic brake pipe (a metallic pipe). The intake pipe 16 is a brake hose formed so as to become flexible from a material such as rubber.

The second unit 1B and the wheel cylinder 2 of each of the wheels are connected to each other via a wheel cylinder pipe 120, which will be described below.

Figure 2:
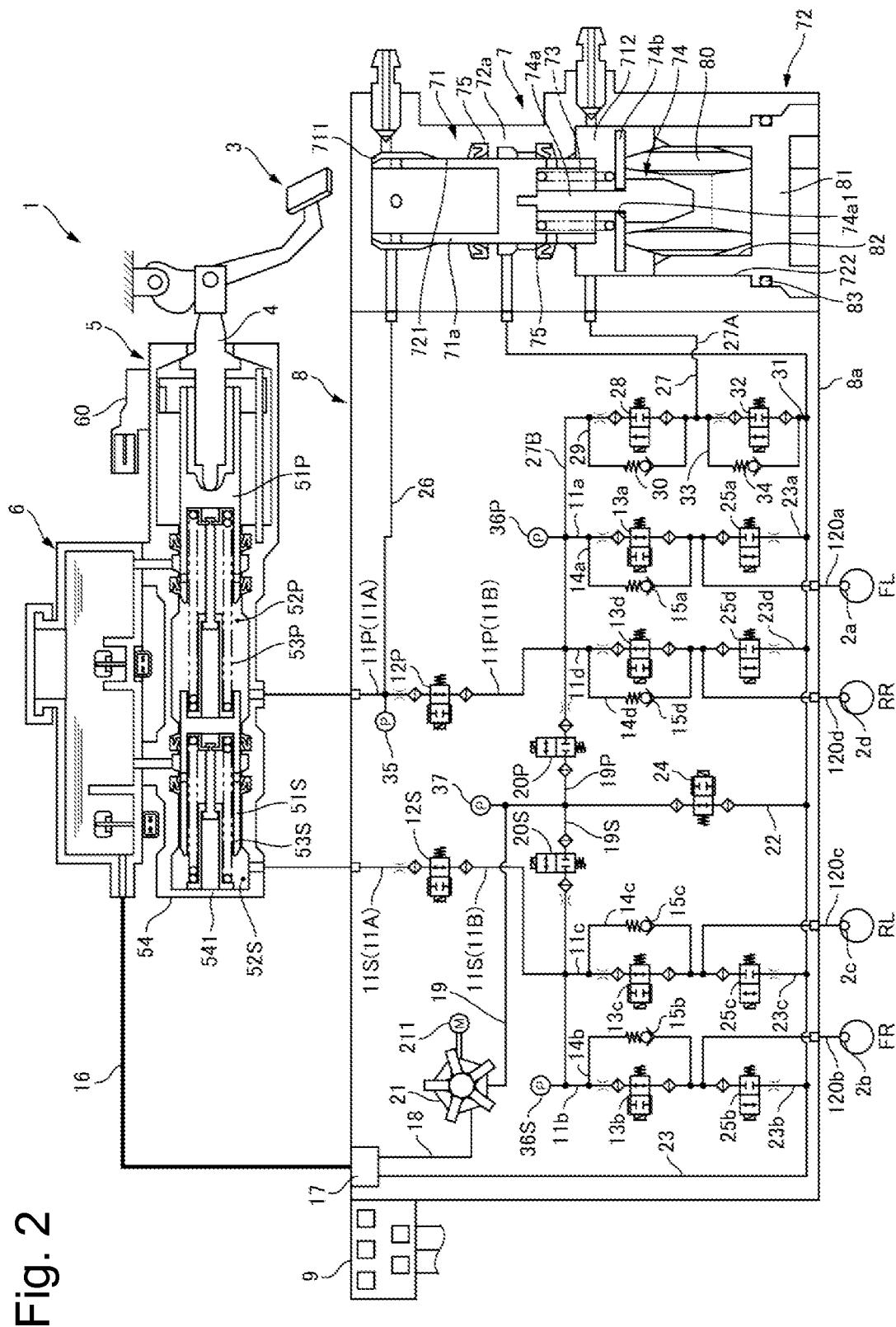
FIG. 2 illustrates the configuration of a brake control apparatus 1 according to the first embodiment.

FIG. 2 illustrates the configuration of the brake control apparatus 1 according to the first embodiment.

The brake control apparatus 1 is mounted on a hybrid automobile including an electric motor (a generator) in addition to an internal combustion engine, an electric automobile including only an electric motor, and the like, besides a general vehicle including only an internal combustion engine (an engine) as a prime mover that drives the wheels.

The brake control apparatus 1 includes a disk brake mounted on each of the wheels (the front left wheel FL, the front right wheel FR, the rear left wheel RL, and the rear right wheel RR) and configured to be actuated according to the hydraulic pressure in the wheel cylinder 2.

The brake control apparatus 1 provides a braking torque to each of the wheels FL to RR by adjusting the hydraulic pressure in the wheel cylinder 2.

The brake pedal 3 is the brake operation member that receives the input of the driver's brake operation. A push rod 4, which is an operation rod, strokes according to the operation on the brake pedal 3. The master cylinder 5 is actuated according to the stroke amount of the push rod 4 to generate a brake hydraulic pressure (a master cylinder hydraulic pressure).

The master cylinder 5 is replenished with the brake fluid from the reservoir tank 6 storing the brake fluid therein.

The master cylinder 5 is a tandem-type master cylinder, and includes a primary piston 51P and a secondary piston 51S, which stroke according to the stroke of the push rod 4. These pistons 51P and 51S are arranged in series along the axial direction of the push rod 4.

The primary piston 51P is connected to the push rod 4. The secondary piston 51S is configured as a free piston.

A stroke sensor 60 is mounted on the master cylinder 5. The stroke sensor 60 detects the stroke amount of the primary piston 51P as a pedal stroke amount of the brake pedal 3.

The stroke simulator 7 is actuated in reaction to the driver's brake operation. The stroke simulator 7 generates a pedal stroke with the aid of an inflow of the brake fluid flowing out of inside the master cylinder 5 according to the driver's brake operation.

A piston 71 of the stroke simulator 7 is actuated axially in a cylinder 72 against the biasing force of a spring 73 due to the brake fluid supplied from the master cylinder 5. By this operation, the stroke simulator 7 generates an operation reaction force according to the driver's brake operation.

The hydraulic pressure unit 8 can provide the braking force to each of the wheels FL to RR independently of the driver's brake operation.

The hydraulic pressure unit 8 receives supply of the brake fluid from the master cylinder 5 and the reservoir tank 6. The hydraulic pressure unit 8 is disposed between the master cylinder 5 and the wheel cylinders 2.

The hydraulic pressure unit 8 includes the motor 211 of a pump (a hydraulic pressure source) 21 and a plurality of electromagnetic valves (shut-off valves 12 and the like) as actuators for generating a control hydraulic pressure.

The pump 21 sucks the brake fluid from the reservoir tank 6, and discharges the brake fluid toward the wheel cylinders 2. The pump 21 is, for example, a plunger pump. The motor 211 is, for example, a brushed motor. The shut-off valves 12 and the like perform opening/closing operations according to control signals to switch the communication states of fluid passages 11 and the like, thereby controlling the flow of the brake fluid.

The hydraulic pressure unit 8 increases the pressures in the wheel cylinders 2 with use of the brake hydraulic pressure generated by the pump 21 with the master cylinder 5 and the wheel cylinders 2 out of communication with each other. Further, the hydraulic pressure unit 8 includes hydraulic pressure sensors 35 to 37, which detect hydraulic pressures at the respective locations.

The control unit 9 controls the actuation of the hydraulic pressure unit 8. Information regarding the running state transmitted from the vehicle side (the wheel speed and the like) is input to the control unit 9 in addition to detection values transmitted from the stroke sensor 60 and the hydraulic pressure sensors 35 to 37.

The control unit 9 performs information processing according to a built-in program based on the input various kinds of information to calculate a target wheel cylinder hydraulic pressure of each of the wheel cylinders 2. The control unit 9 outputs an instruction signal to each of the actuators in the hydraulic pressure unit 8 in such a manner that the wheel cylinder hydraulic pressure in the wheel cylinder 2 matches the target wheel cylinder hydraulic pressure.

As a result, the control unit 9 can realize various kinds of brake control (boosting control, anti-lock control, brake control for vehicle motion control, autonomous brake control, regenerative cooperative brake control, and the like).

The boosting control assists the brake operation by generating a brake hydraulic pressure by which the driver's brake pressing force is insufficient. The anti-lock control prevents a braking slip (a lock tendency) of each of the wheels FL to RR. The vehicle motion control is vehicle behavior stabilization control for preventing a sideslip and the like. The autonomous brake control is preceding vehicle following control, autonomous emergency brake, and the like. The regenerative cooperative brake control controls the hydraulic pressures in the wheel cylinders 2 so as to achieve a target deceleration in cooperation with regenerative brake.

Both the pistons 51P and 51S of the master cylinder 5 are contained in a cylinder 54.

A primary hydraulic pressure chamber 52P is defined between the two pistons 51P and 51S of the master cylinder 5. A compression coil spring 53P is set in the primary hydraulic pressure chamber 52P.

A secondary hydraulic pressure chamber 52S is defined between the secondary piston 51S and a bottom portion 541 of the cylinder 54. A compression coil spring 53S is set in the secondary hydraulic pressure chamber 52S. The fluid passage (a connection fluid passage) 11 is opened to each of the hydraulic pressure chambers 52P and 52S. Each of the hydraulic pressure chambers 52P and 52S is connectable to the hydraulic pressure unit 8 and is also communicable with the wheel cylinders 2 via the fluid passage 11.

The driver's operation of pressing the brake pedal 3 causes the strokes of the pistons 51, thereby generating the master cylinder hydraulic pressures according to reductions in the volumes of the hydraulic pressure chambers 52. Generally equal master cylinder hydraulic pressures are generated in the two hydraulic pressure chambers 52P and 52S.

As a result, the brake fluid is supplied from the hydraulic pressure chambers 52 toward the wheel cylinders 2 via the fluid passages 11 and the wheel cylinder pipes 120. The master cylinder 5 increases the pressures in the wheel cylinders 2a and 2d of the P system via the fluid passage of the P system (the fluid passage 11P) and the wheel cylinder pipes 120a and 120d with use of the master cylinder hydraulic pressure generated in the primary hydraulic pressure chamber 52P. Further, the master cylinder 5 increases the pressures in the wheel cylinders 2b and 2c of the S system via the fluid passage of the S system (the fluid passage 11S) and the wheel cylinder pipes 120b and 120c with use of the master cylinder hydraulic pressure generated in the second hydraulic pressure chamber 52S.

The stroke simulator 7 includes the cylinder 72, the piston 71, the spring 73, and a rubber damper 80. The cylinder 72 includes a cylinder main body 72a having a cylindrical inner peripheral surface, and a plug 81. The piston 71 includes a piston main body 71a and a stem 74. The rubber damper 80 serves as an elastic member and has a hollow shape.

The cylinder main body 72a includes a containing portion 721 and a containing portion 722. The containing portion 721 contains the piston main body 71a. The containing portion 722 contains the stem 74, the rubber damper 80, and the plug 81.

The containing portion 721 is smaller in diameter than the containing portion 722.

The piston main body 71a is axially movable in the containing portion 721. The piston main body 71a divides the inside of the cylinder 72 into a positive-pressure chamber 711 as a first chamber and a back-pressure chamber 712 as a second chamber. A fluid passage 26 is constantly opened to the positive-pressure chamber 711. A fluid passage 27 is constantly opened to the back-pressure chamber 712.

The detailed configuration will be described below.

The hydraulic pressure unit 8 includes a housing 8a. The housing 8a includes a plurality of fluid passages (the fluid passages 11 and the like). The pump 21, the motor 211, and the plurality of electromagnetic valves (the shut-off valves 12 and the like) are fixed to the housing 8a.

The fluid passages 11 connect the hydraulic pressure chambers 52 of the master cylinder 5 and the wheel cylinder pipes 120 therebetween. The fluid passage 11P branches off into a fluid passage 11a and a fluid passage 11d. The fluid passage 11S branches off into a fluid passage 11b and a fluid passage 11c. The shut-off valves 12 are normally-opened (opened when no electric power is supplied thereto) electromagnetic proportional valves provided in the fluid passages 11. The electromagnetic proportional valve can realize an arbitrary opening degree according to an electric current supplied to the solenoid. Each of the fluid passages 11 is divided into a fluid passage 11A on the master cylinder 5 side and a fluid passage 11B on the wheel cylinder 2 side by the shut-off valve 12.

Solenoid IN valves 13 are normally-opened electromagnetic proportional valves provided in correspondence with the individual wheels FL to RR on the wheel cylinder 2 side (in the fluid passages 11a to 11d) with respect to the shut-off valves 12 in the fluid passages 11. Bypass fluid passages 14 are provided in the fluid passages 11. The bypass fluid passages 14 bypass the solenoid IN valves 13. A check valve 15 is provided in each of the bypass fluid passages 14. The check valve 15 permits only a flow of the brake fluid from the wheel cylinder 2 side toward the master cylinder 5 side.

The intake pipe 16 connects the reservoir tank 6 and an internal reservoir 17 formed in the housing 8a. A fluid passage 18 connects the internal reservoir 17 and the intake side of the pump 21. A fluid passage 19 connects the discharge side of the pump 21 and a portion in each of the fluid passages 11B between the shut-off valve 12 and the solenoid IN valve 13. The fluid passage 19 branches off into a fluid passage 19P of the P system and a fluid passage 19S of the S system. The two fluid passages 19P and 19S are connected to the fluid passages 11P and 11S, respectively. The two fluid passages 19P and 19S function as a communication passage connecting the fluid passages 11P and 11S to each other.

Communication valves 20 are normally-closed (closed when no electric power is supplied thereto) ON/OFF valves provided in the fluid passages 19. The ON/OFF valve is switched between two values, i.e., switched to be either opened or closed according to an electric current supplied to the solenoid.

The pump 21 generates the wheel cylinder hydraulic pressures by generating the hydraulic pressures in the fluid passages 11 with use of the brake fluid supplied from the reservoir tank 6. The pump 21 is connected to the wheel cylinders 2a to 2d via the fluid passages 19, the fluid passages 11P and 11S, and the wheel cylinder pipes 120, and increases the pressures in the wheel cylinders 2 by discharging the brake fluid to the fluid passages 19.

A fluid passage 22 connects a branch point between the two fluid passages 19P and 19S and the fluid passages 23. A pressure adjustment valve 24 is provided in the fluid passage 22. The pressure adjustment valve 24 is a normally-opened electromagnetic proportional valve.

The fluid passages 23 connect the wheel cylinder 2 side of the fluid passages 11B with respect to the solenoid IN valves 13, and the internal reservoir 17. Solenoid OUT valves 25 are normally-closed ON/OFF valves provided in the fluid passages 23.

The fluid passage 26 branches off from the fluid passage 11A of the P system to be connected to the positive-pressure chamber 711 of the stroke simulator 7. The hydraulic pressure unit 8 may be configured in such a manner that the fluid passage 26 directly connects the primary hydraulic pressure chamber 52P and the positive-pressure chamber 711 without the intervention of the fluid passage 11P (11A).

The fluid passage 27 connects the back-pressure chamber 712 of the stroke simulator 7 and the fluid passage 11P (11B) therebetween.

More specifically, the fluid passage 27 branches off from a portion in the fluid passage 11P (11B) between the shut-off valve 12P and the solenoid IN valve 13 to be connected to the back-pressure chamber 722.

A stroke simulator IN valve 28 is a normally-closed ON/OFF valve provided in the fluid passage 27.

The fluid passage 27 is divided into a fluid passage 27A on the back-pressure 712 side and a fluid passage 27B on the fluid passage 11 side by the stroke simulator IN valve 28. A bypass fluid passage 29 is provided in parallel with the fluid passage 27 while bypassing the stroke simulator IN valve 28. The bypass fluid passage 29 connects the fluid passage 27A and the fluid passage 27B therebetween. A check valve 30 is provided in the bypass fluid passage 29. The check valve 30 permits a flow of the brake fluid heading from the fluid passage 27A toward the fluid passage 11 (27B) side, and prohibits a flow of the brake fluid in the opposite direction therefrom.

A fluid passage 31 connects the back-pressure chamber 712 of the stroke simulator 7 and the fluid passages 23 therebetween.

A stroke simulator OUT valve 32 is a normally-closed ON/OFF valve provided in the fluid passage 31. A bypass fluid passage 33 is provided in parallel with the fluid passage 31 while bypassing the stroke simulator OUT valve 32. A check valve 34 is provided in the bypass fluid passage 33. The check valve 34 permits a flow of the brake fluid heading from the fluid passage 23 side toward the back-pressure chamber 712 side, and prohibits a flow of the brake fluid in the opposite direction therefrom.

The master cylinder hydraulic pressure sensor 35 is provided between the shut-off valve 12P and the master cylinder 5 (the fluid passage 11A) in the first fluid passage 11P. The master cylinder hydraulic pressure sensor 35 detects a hydraulic pressure at this portion (the master cylinder hydraulic pressure).

The wheel cylinder hydraulic pressure sensors (a P-system pressure sensor and an S-system pressure sensor) 36 are provided between the shut-off valves 12 and the solenoid IN valves 13 in the first fluid passages 11. The wheel cylinder hydraulic pressure sensors 36 detect hydraulic pressures at these portions (the wheel cylinder hydraulic pressures).

The discharge pressure sensor 37 is provided between the discharge side of the pump 21 and the communication valves 20 in the fluid passage 19. The discharge pressure sensor 93 detects a hydraulic pressure at this portion (a pump discharge pressure).

A first system is formed by a brake system (the fluid passages 11) that connects the hydraulic pressure chambers 52 of the master cylinder 5 and the wheel cylinder pipes 120 therebetween with the shut-off valves 12 opened. This first system can realize pressing force brake (non-boosting control) by generating the wheel cylinder hydraulic pressures from the master cylinder hydraulic pressures generated with use of the pressing force.

On the other hand, a second system is formed by a brake system (the fluid passage 19, the fluid passage 22, the fluid passages 23, and the like) that includes the pump 21 and connects the reservoir tank 6 and the wheel cylinders 2 therebetween with the shut-off valves 12 closed. This second system constructs a so-called brake-by-wire device, which generates the wheel cylinder hydraulic pressures from the hydraulic pressure generated with use of the pump 21, and can realize the boosting control and the like as brake-by-wire control. At the time of the brake-by-wire control, the stroke simulator 7 creates the operation reaction force accompanying the driver's brake operation.

Figure 3:
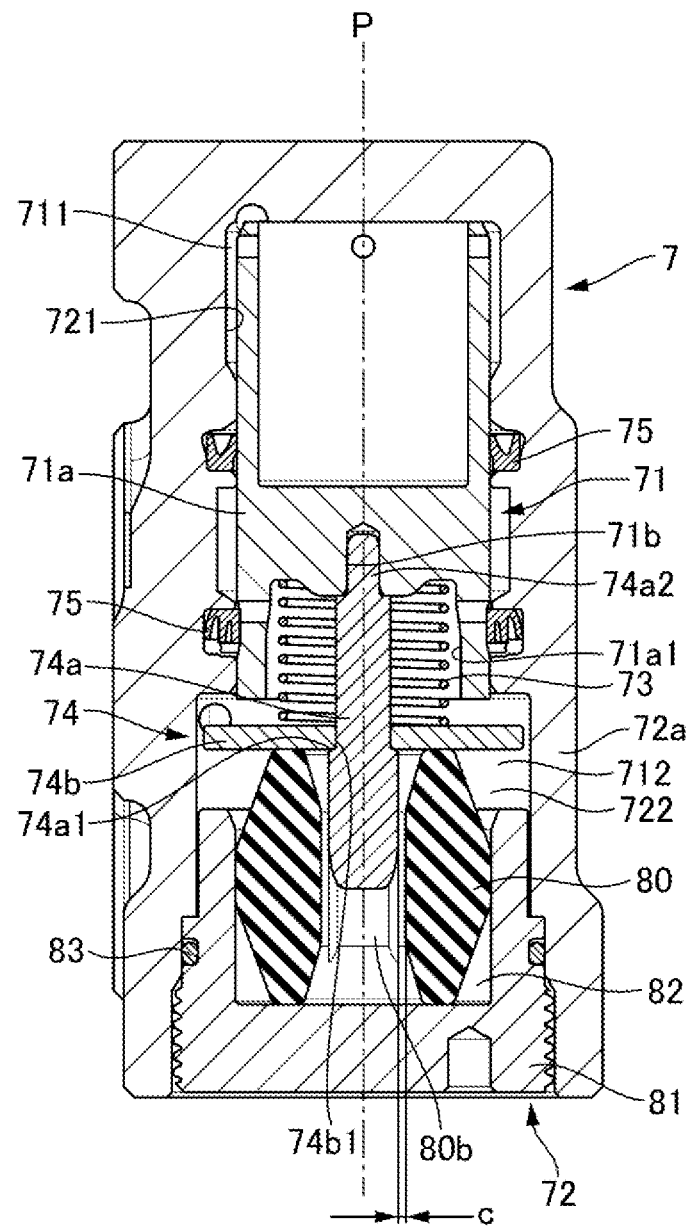
FIG. 3 is a cross-sectional view of a stroke simulator 7 according to the first embodiment.

FIG. 3 is a cross-sectional view of the stroke simulator 7 according to the first embodiment.

As described above, the stroke simulator 7 includes the cylinder 72, the piston 71, the spring 73, and the rubber damper 80. The cylinder 72 includes the cylinder main body 72a having the cylindrical inner peripheral surface, and the plug 81. The piston 71 includes the piston main body 71a and the stem 74. The rubber damper 80 serves as the elastic member and has the hollow shape.

The plug 81 forms the cylinder 72 by being threadedly engaged with the opening end of the cylinder main body 72a and being sealingly closed by a plug seal 83.

Further, the stem 74 includes a shaft member 74a and a retainer 74b. The shaft member 74a is inserted in a hole 74b1 of the retainer 74b.

The retainer 74b is movable in the direction of an axis P relative to the shaft member 74a.

The cylinder main body 72a includes the containing portion 721 and the containing portion 722. The containing portion 721 contains the piston main body 71a. The containing portion 722 contains the stem 74, the rubber damper 80, and the plug 81.

Two piston seals 75 are set on the outer periphery of the piston 71. The piston seals 75 are in contact with the inner peripheral surface of the containing portion 721, and seal between the inner peripheral surface of the containing portion 721 and the outer peripheral surface of the piston main body 71a. The piston seals 75 are separation seal members that seal between the positive-pressure chamber 711 and the back-pressure chamber 712 to thereby liquid-tightly separate them, and complement the function of the piston main body 71a.

The spring 73 is a compression coil spring set in the back-pressure chamber 712, and biases the piston main body 71a from the back-pressure chamber 712 side toward the positive-pressure chamber 711 side. The spring 73 generates the reaction force according to the compression amount.

The spring 73 is disposed between the piston main body 71a and the retainer 74b of the stem 74.

The retainer 74b of the stem 74 subjected to the biasing force of the spring 73 is engaged with a stepped portion 74a1 of the shaft member 74a fixed to the piston main body 71a, thereby being restricted from moving more than that.

The rubber damper 80 is inserted in a containing portion 82 formed on the back-pressure chamber 712 side of the plug 81 with the outer peripheral surface of the rubber damper 80 in pressure contact with the inner peripheral surface of the containing portion 82, and is disposed between the retainer 74b of the stem 74 and the plug 81. The rubber damper 80 also generates the reaction force according to the compression amount.

The rubber damper 80 is in pressure contact with the inner peripheral surface of the containing portion 82, thereby being positioned and held there. The outer peripheral surface of the shaft member 74a of the stem 74 inserted in a through-hole 80b of the rubber damper 80 is separated from the inner peripheral surface of the through-hole 80b by a predetermined distance c and is out of contact therewith.

Therefore, the spring 73 and the rubber damper 80 are arranged in series via the retainer 74b between the piston main body 71a and the plug 81.

The spring constant of the spring 73 is significantly small compared to the spring constant of the rubber damper 80.

Due to this configuration, the stroke simulator 7 is actuated according to the driver's brake operation, and provides the reaction force and the stroke to the brake pedal 3.

Figure 4:
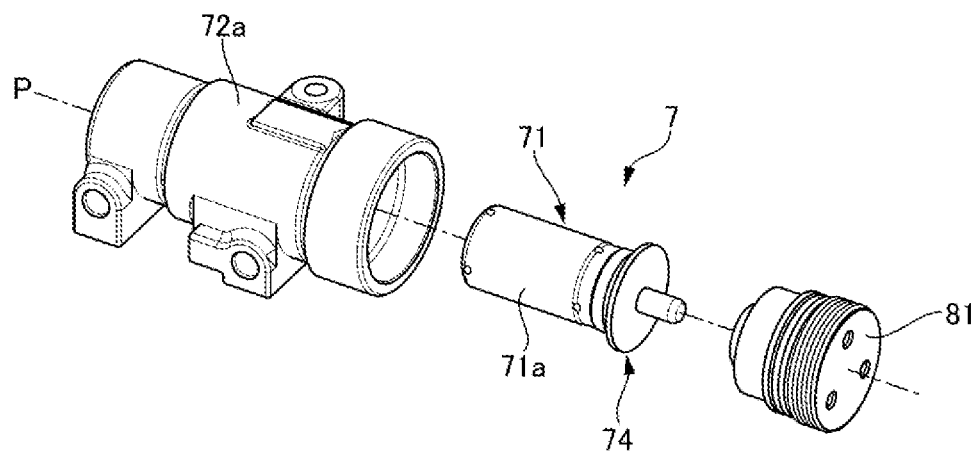
FIG. 4 is an exploded perspective view of the stroke simulator 7 according to the first embodiment.
Figure 5:
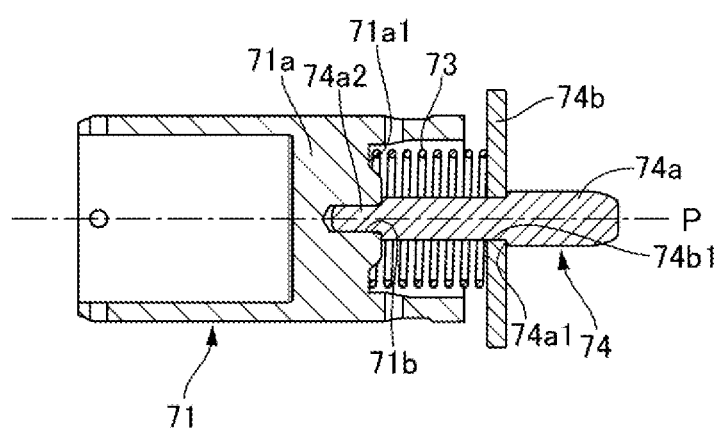
FIG. 5 is a cross-sectional view of a piston 71 of the stroke simulator 7 according to the first embodiment.
Figure 6:
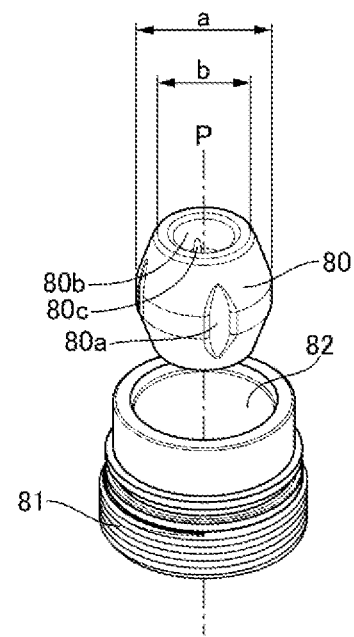
FIG. 6 is a perspective view of a rubber damper 80 and a plug 81 of the stroke simulator 7 according to the first embodiment.
Figure 7A:
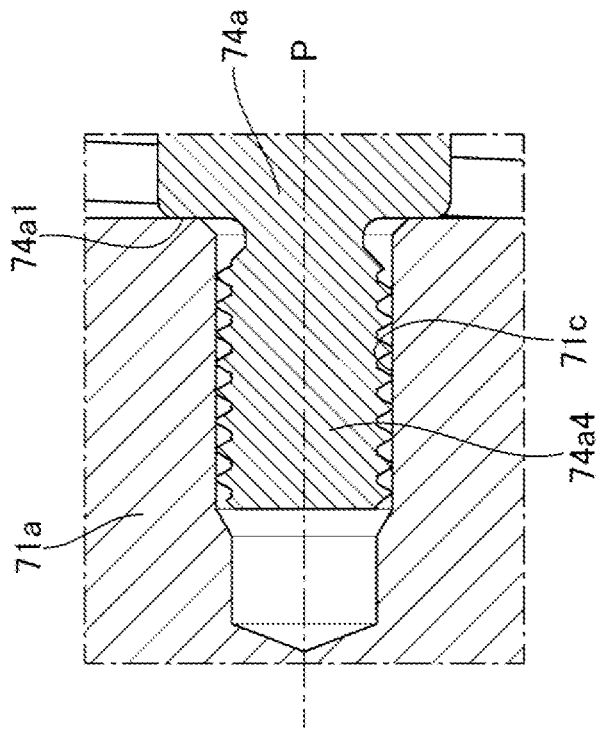
FIG. 7A is a partially enlarged cross-sectional view illustrating press-fitting fixation between a piston main body 71a and a shaft member 74a of a stem 74 in the stroke simulator 7 according to the first embodiment.
Figure 7B:
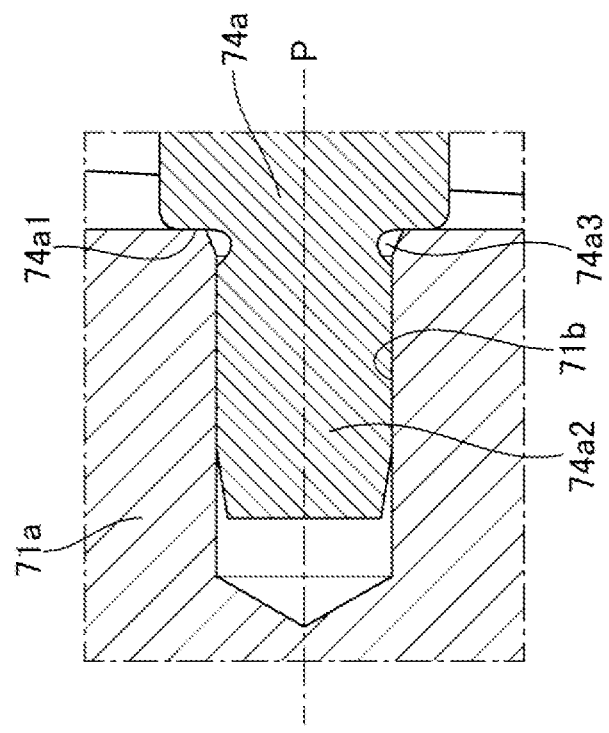
FIG. 7B is a partially enlarged cross-sectional view illustrating screw fixation between the piston main body 71a and the shaft member 74a of the stem 74 in the stroke simulator 7 according to the first embodiment.

FIG. 4 is an exploded perspective view of the stroke simulator 7 according to the first embodiment. FIG. 5 is a cross-sectional view of the piston 71. FIG. 6 is a perspective view of the rubber damper 80 and the plug 81. FIG. 7(a) is a partially enlarged cross-sectional view illustrating press-fitting fixation between the piston main body 71a of the stroke simulator 7 and the shaft member 74a of the stem 74 according to the first embodiment. FIG. 7(b) is a partially enlarged cross-sectional view illustrating screw fixation between the piston main body 71a of the stroke simulator 7 and the shaft member 74a of the stem 74 according to the first embodiment.

The piston 71 including the piston main body 71a and the stem 74, and the spring 73 are configured as a sub-assembly.

As described above, the stem 74 includes the shaft member 74a and the retainer 74b.

More specifically, as illustrated in FIG. 5, a press-fitting portion 74a2 formed on the shaft member 74a of the stem 74 is fixedly press-fitted into a press-fitting hole 71b formed in the piston main body 71a while compressing the spring 73. At this time, one side and the other side of the spring 73 are in abutment with an opening bottom portion 71a1 of the piston main body 71a and the retainer 74b, respectively.

Further, as illustrated in FIG. 7(a), a groove 74a3 is formed on one side of the press-fitting portion 74a2 formed on the shaft member 74a of the stem 74 that is closer to the opening end of the press-fitting hole 71b formed in the piston main body 71a (the base of the press-fitting portion).

Aluminum chips and a peeled alumite may be generated due to, for example, the press-fitting between the piston main body 71a made from an aluminum material and the stem 74 made from an iron material, but this groove 74a3 can trap contamination such as the aluminum chips and the alumite so as to prevent them from flowing out into the hydraulic fluid.

Further, as illustrated in FIG. 7(b), the stroke simulator 7 may be configured in such a manner that the piston main body 71a, and the spring 73 and the stem 74 are coupled with the aid of screw fixation by forming a female screw 71c on the piston main body 71a and threadedly engaging a male screw 74a4 formed on the shaft member 74a of the stem 74 therein.

The coupling with the aid of the screw fixation can prevent the generation of the contamination such as the aluminum chips and the alumite.

In this manner, the present configuration can allow the spring 73 to have a set load and also improve the mountability into the cylinder 72 including the cylinder main body 72a and the plug 81 by press-fitting or threadedly fixing the stem 74 into the piston main body 71a.

Further, as illustrated in FIG. 6, an outer diameter b at each of the both ends of the rubber damper 80 in the direction of the axis P is formed so as to be smaller than an outer diameter a at the central portion, and has a taper shape.

This taper shape of the rubber damper 80 in the direction of the axis P can improve the insertability into the rubber damper containing portion 82 formed in the plug 81 and also allow the rubber damper 80 to be mounted without distinguishing the insertion direction because of the symmetry in the direction of the axis P.

Figure 9:
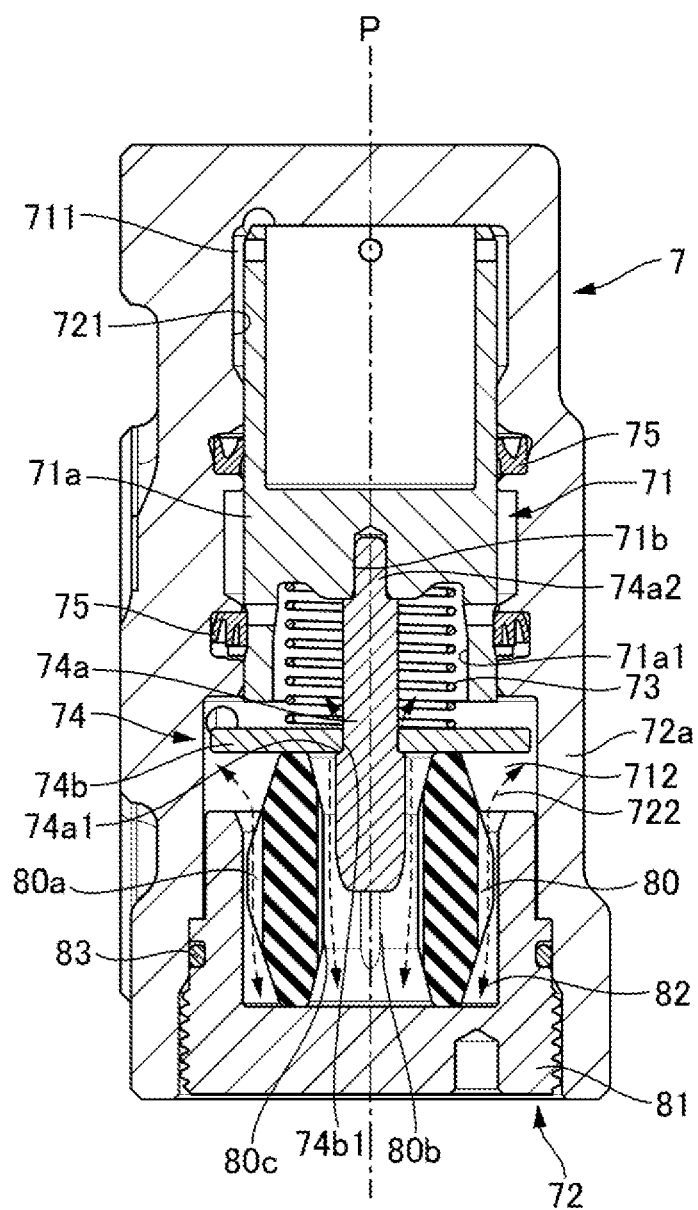
FIG. 9 is a cross-sectional view illustrating the functions of grooves 80a and 80c of the rubber damper 80 of the stroke simulator 7 according to the first embodiment.

FIG. 8(a) is a perspective view of the rubber damper 80 of the stroke simulator 7 according to the first embodiment. FIG. 8(b) is a plan view of the rubber damper 80 of the stroke simulator 7 according to the first embodiment. FIG. 9 is a cross-sectional view illustrating the function of grooves 80c and 80a on the inner and outer peripheries of the rubber damper 80 of the stroke simulator 7 according to the first embodiment.

As illustrated in FIGS. 8(a) and 8(b), four outer peripheral grooves 80a extending in the direction of the axis P are formed at the central portion of the outer periphery of the rubber damper 80, and four inner peripheral grooves 80c extending in the direction of the axis P are formed on the inner periphery of the rubber damper 80.

Forming these inner and outer peripheral grooves 80c and 80a allows the hydraulic fluid present in the space below the retainer 74b of the stem 74 as viewed in FIG. 9 to smoothly flow into the space above the retainer 74b of the stem 74 as viewed in FIG. 9 via the grooves 80c and 80a on the inner and outer peripheries as indicated by arrowed broken lines when the rubber damper 80 is compressed and deformed by the stem 74 (when the brake pedal 3 is pressed), and allows the hydraulic fluid (the brake fluid) moved into the space above the retainer 74b of the stem 74 as viewed in FIG. 9 to smoothly return to the space below the retainer 74b of the stem 74 as viewed in FIG. 9 via the grooves 80c and 80a on the inner and outer peripheries as indicated by arrowed broken lines when the rubber damper 80 is returned from the compression and deformation (when the brake pedal 3 is returned), as illustrated in FIG. 9. Further, during air removal work when the hydraulic fluid (the brake fluid) is replaced, with the back-pressure chamber 712 not filled with the hydraulic fluid (the brake fluid), the arrowed broken lines indicate the flow of air, and the air can be smoothly released into the space above the retainer 74b of the stem 74 as viewed in FIG. 9 via the grooves 80c and 80a on the inner and outer peripheries.

Figure 10:
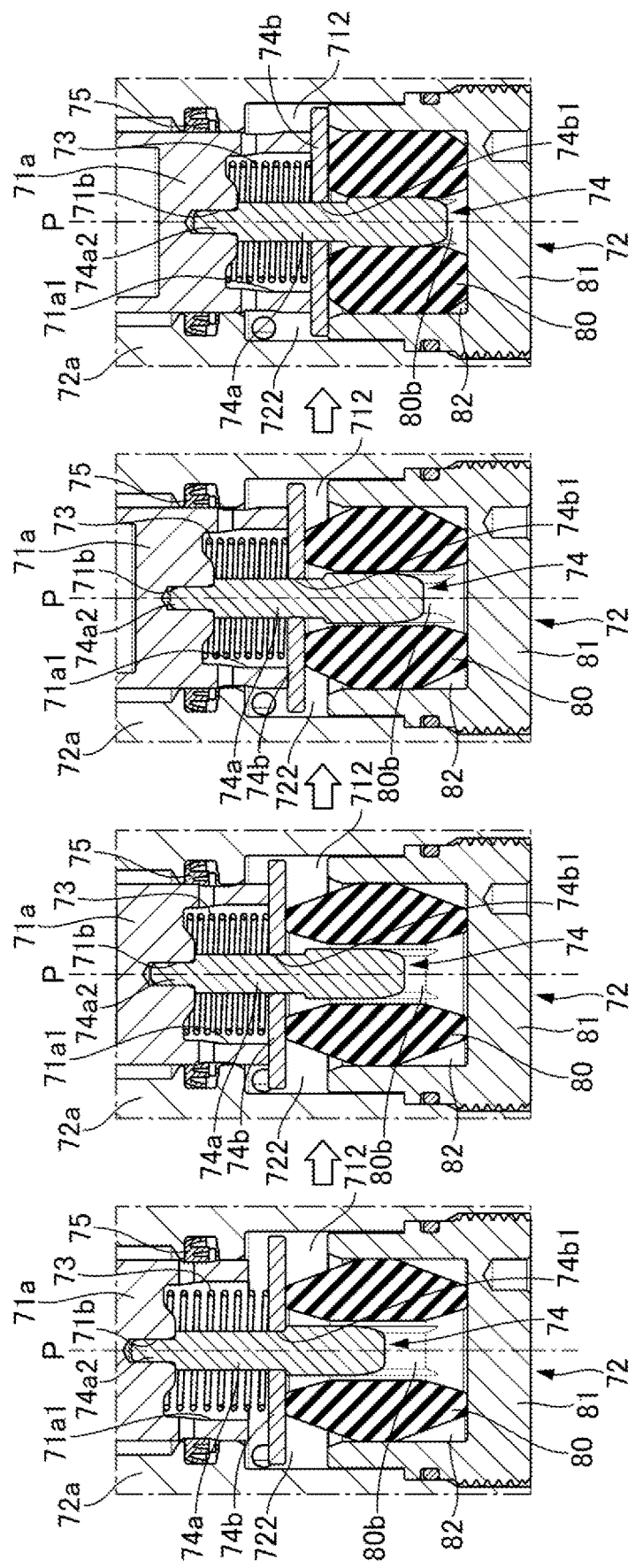
FIG. 10 is a cross-sectional view illustrating the operation of the stroke simulator 7 according to the first embodiment.

FIG. 10 is a cross-sectional view of the operation of the stroke simulator 7 according to the first embodiment.

FIG. 10 illustrates operation states of an initial state, a normal-use stroke region, a pressing latter-half stroke region, and a full stroke region from the left side thereof.

In the initial state and the normal-use stroke region (a stroke control region), the spring 73 having the small spring constant plays a main role, and the spring 73 generates the reaction force by being compressed and deformed in the direction of the axis P according to the movement of the piston 71 in the direction of the axis P.

In the normal-use stroke region, due to the compression and deformation of the spring 73, the shaft member 74a of the stem 74 is separated from the retainer 74b of the stem 74 and further deeply enters the through-hole 80b of the rubber damper 80.

At this time, because the inner peripheral surface of the through-hole 80b of the rubber damper 80 is out of contact with the outer peripheral surface of the shaft member 74a of the stem 74, and the range where the rubber damper 80 is in contact with the retainer 74b and the plug 81 is also small, the occurrence of friction can be reduced and a smooth pedal feeling with low hysteresis can be acquired due to the compression and deformation mainly occurring on the spring 73.

Next, when the stroke simulator 7 enters the pressing latter-half stroke region (a pressing force control region), due to the movement of the piston 71 in the direction of the axis P, the rubber damper 80 also starts being compressed and deformed in the direction of the axis P via the retainer 74b and the through-hole 80b also starts being reduced in diameter along therewith, leading to a reduction in the distance between the inner peripheral surface of the through-hole 80b and the outer peripheral surface of the shaft member 74a of the stem 74.

As the stroke simulator 7 approaches the full stroke region (the pressing force control region), the rubber damper 80 is also further largely compressed and deformed in the direction of the axis P, and the inner peripheral surface of the through-hole 80b and the outer peripheral surface of the shaft member 74a of the stem 74 start contacting each other. Then, the rubber damper 80 is restricted from being radially deformed and the friction (the hysteresis) gradually increases. As a result, a spring-like feeling reduces and a further natural pedal feeling can be acquired.

Next, the functions and advantageous effects will be described.

The stroke simulator and the brake control apparatus according to the first embodiment fulfill functions and advantageous effects that will be listed below.

(1) The first embodiment is configured in the following manner. The piston 71 includes the piston main body 71a and the stem 74. The piston main body 71a is contained movably in the direction of the axis P of the cylinder 72, which includes the cylinder main body 72a and the plug 81. The shaft member 74a of the stem 74 of the piston 71 is inserted in the through-hole 80b of the hollow-shaped rubber damper 80 in a non-contact state. The rubber member 80 is in pressure contact with the inner peripheral surface of the containing portion 82 of the plug 81, thereby being positioned and held there. Due to the movement of the piston 71 in the direction of the axis P, the spring 73 and the rubber damper 80 are compressed. When the movement of the piston 71 exceeds the predetermined stroke (between the pressing latter-half stroke region and the full stroke region), the inner peripheral surface of the through-hole 80b of the rubber damper 80 and the outer peripheral surface of the shaft member 74a of the stem 74 start contacting each other, by which the rubber damper 80 is restricted from being radially deformed.

Therefore, in the region where the stroke simulator 7 does not exceed the predetermined stroke, the inner peripheral surface of the through-hole 80b of the rubber damper 80 is out of contact with the outer peripheral surface of the shaft member 74a of the stem 74, and the range where the rubber damper 80 is in contact with the retainer 74b and the plug 81 is also small, so that the occurrence of friction can be reduced and a smooth pedal feeling with low hysteresis can be acquired due to the compression and deformation mainly occurring on the spring 73. Along therewith, in the region where the stroke simulator 7 exceeds the predetermined stroke, the rubber damper 80 is also largely compressed and deformed in the direction of the axis P, and the inner peripheral surface of the through-hole 80b of the rubber damper 80 and the outer peripheral surface of the shaft member 74a of the stem 74 start contacting each other. Then, the rubber damper 80 is restricted from being radially deformed and the friction (the hysteresis) gradually increases. As a result, a spring-like feeling reduces and a further natural pedal feeling can be acquired.

(2) The piston 71 including the piston main body 71a and the stem 74 including the shaft member 74a and the retailer 74b, and the spring 73 are configured as a sub-assembly.

More specifically, the piston main body 71a, and the spring 73 and the stem 74 are fixed and coupled to each other by press-fitting or threadedly engaging the press-fitting portion 74a2 or the male screw 74a4 formed on the shaft member 74a of the stem 74 into the press-fitting hole 71b or the female screw 71c formed on the piston main body 71a while bringing the one side of the spring 73 into abutment with the opening bottom portion 71a1 with the other side of the spring 73 in abutment with the retainer 74b.

Therefore, the present configuration can allow the spring 73 to have a set load and also improve the mountability onto the cylinder 72 including the cylinder main body 72a and the plug 81 by press-fitting or threadedly fixing the stem 74 into the piston main body 71a.

Further, in the coupling with the aid of the screw fixation, the present configuration can prevent the generation of the contamination such as the aluminum chips and the alumite.

(3) The groove 74a3 is formed on the one side of the press-fitting portion 74a2 formed on the shaft member 74a of the stem 74 that is closer to the opening end of the press-fitting hole 71b formed in the piston main body 71a (the base of the press-fitting portion).

Therefore, aluminum chips and a peeled alumite may be generated due to, for example, the press-fitting between the piston main body 71a made from an aluminum material and the stem 74 made from an iron material, but the present configuration can trap the contamination such as the aluminum chips and the alumite due to the groove 74a3 so as to prevent them from flowing out into the hydraulic fluid.

(3) The outer diameter b at each of the both ends of the rubber damper 80 in the direction of the axis P is formed so as to be smaller than the outer diameter a at the central portion, and has a taper shape.

Therefore, the taper shape of the rubber damper 80 in the direction of the axis P can improve the insertability into the rubber damper containing portion 82 formed in the plug 81 and also allow the rubber damper 80 to be mounted without distinguishing the insertion direction because of the symmetry in the direction of the axis P.

(4) The four outer peripheral grooves 80a extending in the direction of the axis P are formed at the central portion of the outer periphery of the rubber damper 80, and the four inner peripheral grooves 80c extending in the direction of the axis P are formed on the inner periphery of the rubber damper 80.

Therefore, the present configuration allows the hydraulic fluid present in the space below the retainer 74b of the stem 74 as viewed in the drawing to smoothly flow into the space above the retainer 74b of the stem 74 as viewed in the drawing via the grooves 80c and 80a on the inner and outer peripheries when the rubber damper 80 is compressed and deformed by the stem 74 (when the brake pedal 3 is pressed), and allows the hydraulic fluid (the brake fluid) moved into the space above the retainer 74b of the stem 74 as viewed in the drawing to smoothly return to the space below the retainer 74b of the stem 74 as viewed in the drawing via the grooves 80c and 80a on the inner and outer peripheries when the rubber damper 80 is returned from the compression and deformation (when the brake pedal 3 is returned). Further, during the air removal work when the brake fluid is replaced, with the back-pressure chamber 712 not filled with the brake fluid, the air can be smoothly released into the space above the retainer 74b of the stem 74 as viewed in the drawing via the grooves 80c and 80a on the inner and outer peripheries.

Second Embodiment

Figure 11:
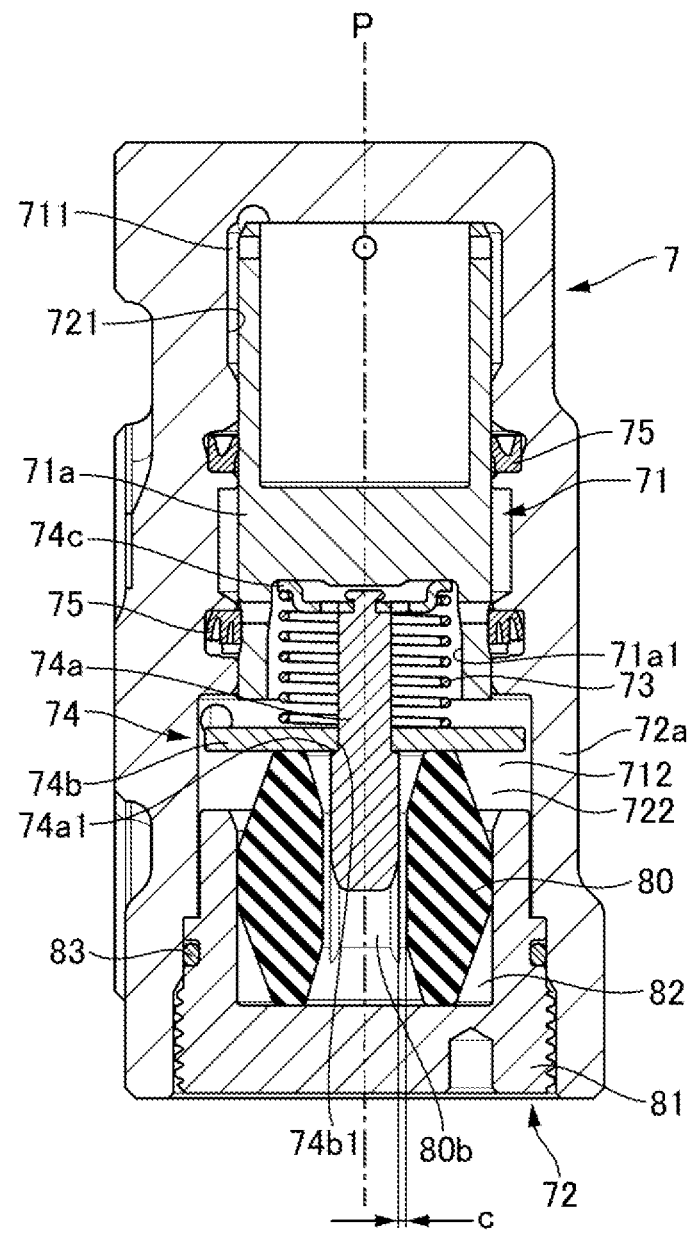
FIG. 11 is a cross-sectional view of the stroke simulator according to a second embodiment.
Figure 12:
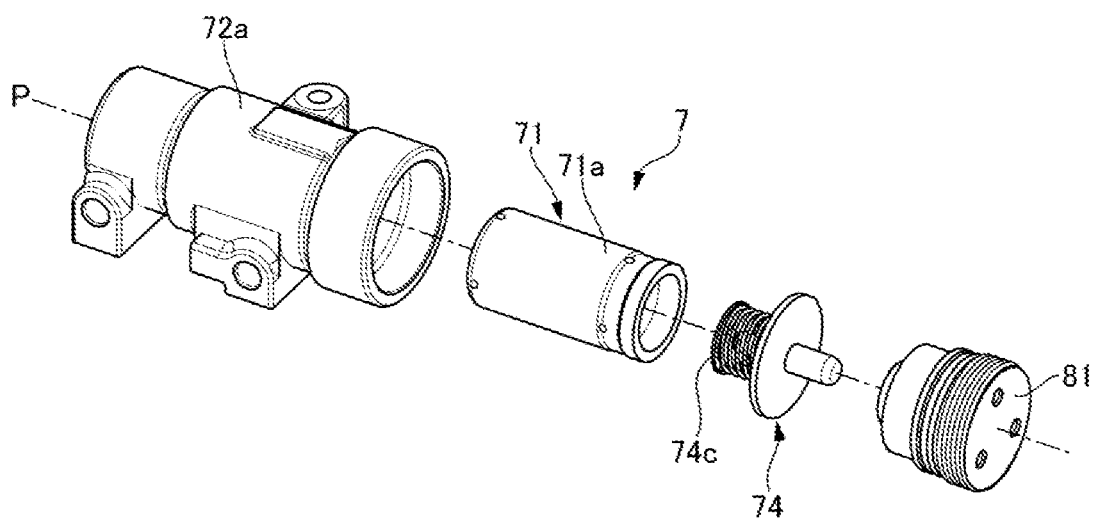
FIG. 12 is an exploded perspective view of the stroke simulator 7 according to the second embodiment.
Figure 13:
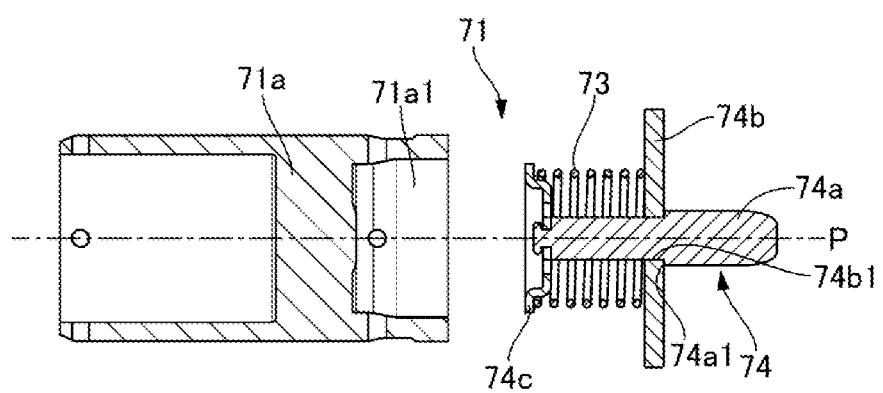
FIG. 13 is a cross-sectional view of the piston 71 of the stroke simulator according to the second embodiment.

FIG. 11 is a cross-sectional view of the stroke simulator according to a second embodiment. FIG. 12 is an exploded perspective view of the stroke simulator 7 according to the second embodiment. FIG. 13 is a cross-sectional view of the piston 71 of the stroke simulator according to the second embodiment.

Unlike the first embodiment, the subassembly is formed only by the stem 74 and the spring 73.

More specifically, as illustrated in FIG. 13, the spring 73 inserted through the shaft member 74a of the stem 74 is sandwiched between the retainers 74b and 74c, and the distal end portion of the shaft member 74a (the left end portion as viewed in FIG. 13) is fixed to the retainer 74c by crimping.

The other configuration is similar to the first embodiment, and therefore components shared with the first embodiment will be identified by the same reference numerals as the first embodiment and the descriptions thereof will be omitted below.

Next, the functions and advantageous effects will be described.

The stroke simulator and the brake control apparatus according to the second embodiment fulfill functions and advantageous effects similar to the first embodiment.

Third Embodiment

Figure 14:
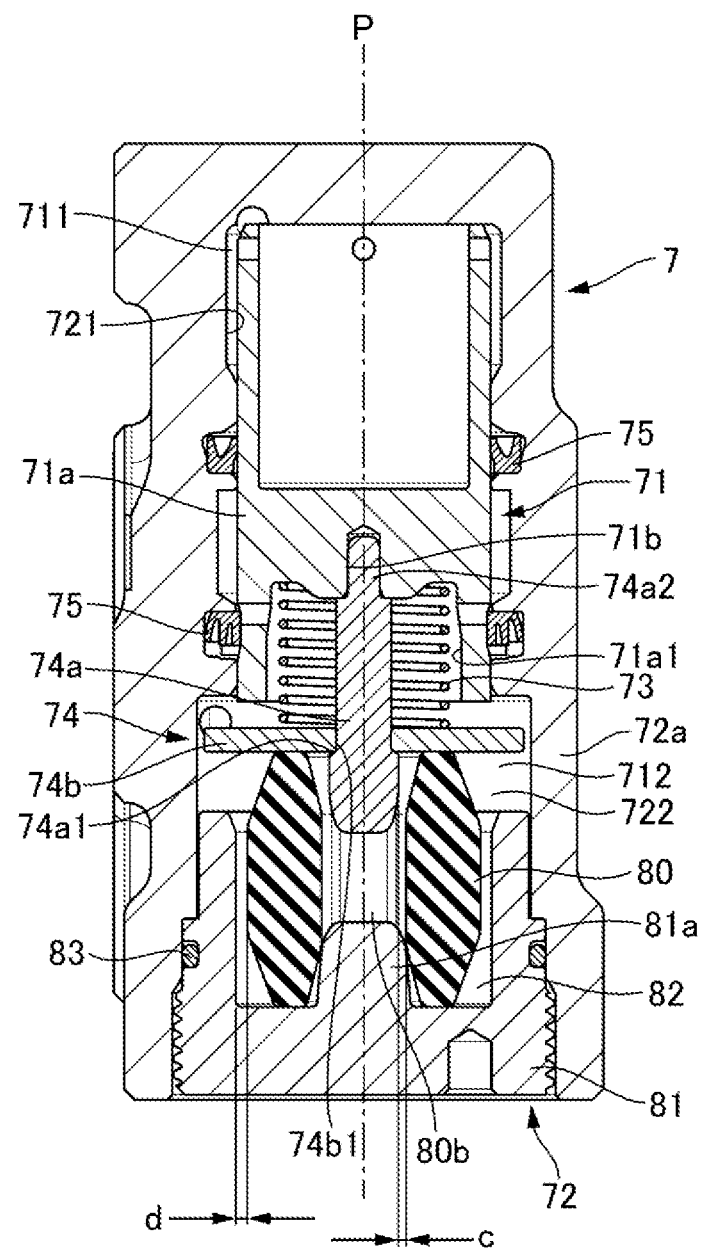
FIG. 14 is a partial cross-sectional view of the stroke simulator 7 according to a third embodiment.

FIG. 14 is a partial cross-sectional view of the stroke simulator 7 according to a third embodiment.

Unlike the first embodiment, the rubber damper 80 is positioned and held by fitting a protrusion portion 81a formed on the bottom surface of the rubber damper containing portion 82 of the plug 81 to the through-hole 80b.

Therefore, the outer peripheral surface of the rubber damper 80 is separated from the inner peripheral surface of the rubber damper containing portion 82 of the plug 81 by a predetermined distance d and is out of contact therewith, and the inner peripheral surface of the through-hole 80b of the rubber damper 80 is also separated from the outer peripheral surface of the shaft member 74a of the stem 74 by the predetermined distance c and is out of contact therewith.

The other configuration is similar to the first embodiment, and therefore components shared with the first embodiment will be identified by the same reference numerals as the first embodiment and the descriptions thereof will be omitted below.

Figure 15:
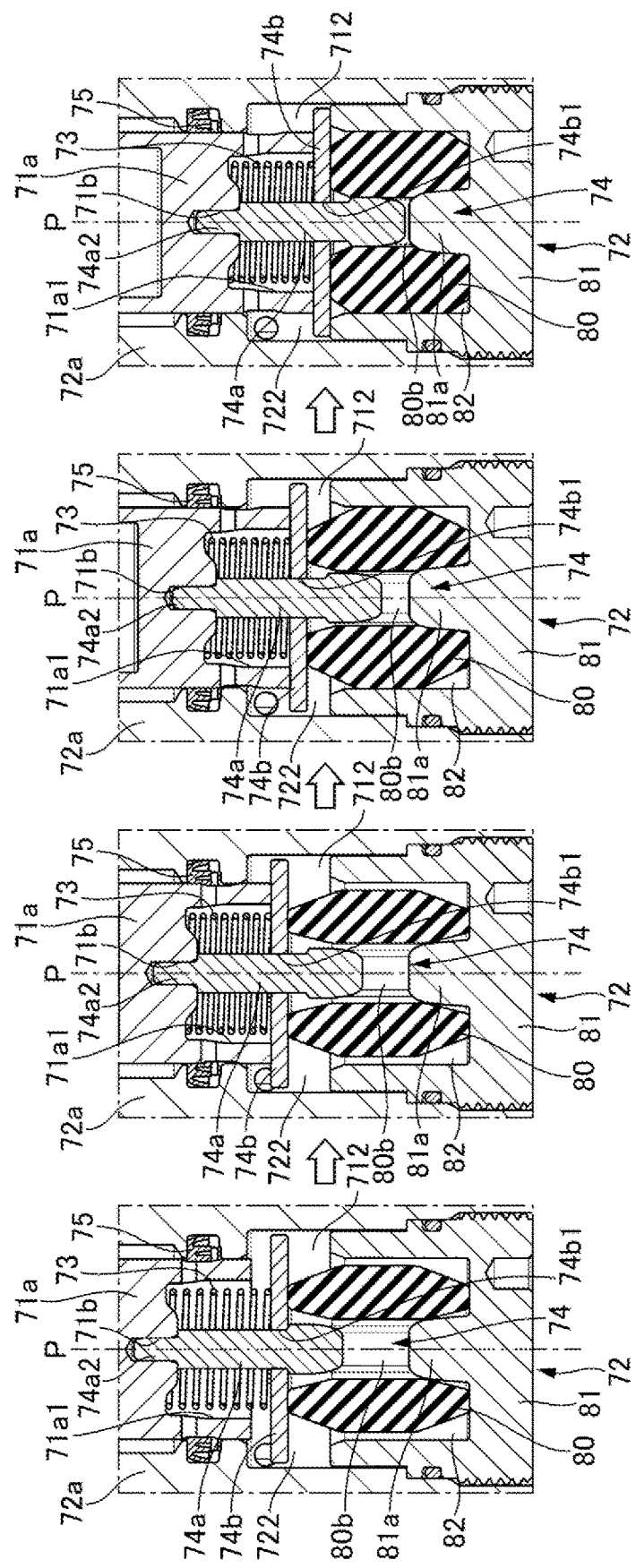
FIG. 15 is a cross-sectional view illustrating the operation of the stroke simulator 7 according to the third embodiment.

FIG. 15 is a cross-sectional view illustrating the operation of the stroke simulator 7 according to the third embodiment.

FIG. 15 illustrates the operation states of the initial state, the normal-use stroke region, the pressing latter-half stroke region, and the full stroke region from the left side thereof.

In the initial state and the normal-use stroke region (the stroke control region), the spring 73 having the small spring constant plays a main role to generate the reaction force by being compressed and deformed in the direction of the axis P according to the movement of the piston 71 in the direction of the axis P.

In the normal-use stroke region, due to the compression and deformation of the spring 73, the shaft member 74a of the stem 74 is separated from the retainer 74b of the stem 74 and further deeply enters the through-hole 80b of the rubber damper 80.

At this time, because the outer peripheral surface of the rubber damper 80 and the inner peripheral surface of the through-hole 80b are out of contact with the inner peripheral surface of the rubber damper containing portion 82 of the plug 81 and the outer peripheral surface of the shaft member 74a of the stem 74, respectively, and the range where the rubber damper 80 is in contact with the retainer 74b and the plug 81 is also small, the occurrence of friction can be reduced and a smooth pedal feeling with low hysteresis can be acquired due to the compression and deformation mainly occurring on the spring 73.

Next, when the stroke simulator 7 enters the pressing latter-half stroke region (the pressing force control region), due to the movement of the piston 71 in the direction of the axis P, the rubber damper 80 also starts being compressed and deformed in the direction of the axis P via the retainer 74b and the outer peripheral surface of the rubber damper 80 is brought into contact with the inner peripheral surface of the rubber damper containing portion 82 of the plug 81 along therewith, and the through-hole 80b also starts being reduced in diameter, leading to a reduction in the distance between the inner peripheral surface of the through-hole 80b and the outer peripheral surface of the shaft member 74a of the stem 74.

As the stroke simulator 7 approaches the full stroke region (the pressing force control region), the rubber damper 80 is also further largely compressed and deformed in the direction of the axis P with the outer peripheral surface of the rubber damper 80 in contact with the inner peripheral surface of the rubber damper containing portion 82 of the plug 81, and the inner peripheral surface of the through-hole 80b and the outer peripheral surface of the shaft member 74a of the stem 74 start contacting each other along therewith. Then, the rubber damper 80 is further restricted from being radially deformed and the friction (the hysteresis) gradually increases. As a result, a spring-like feeling reduces and a further natural pedal feeling can be acquired.

Next, the functions and advantageous effects will be described.

The stroke simulator and the brake control apparatus according to the third embodiment fulfill functions and advantageous effects similar to the first embodiment.

Fourth Embodiment

Figure 16:
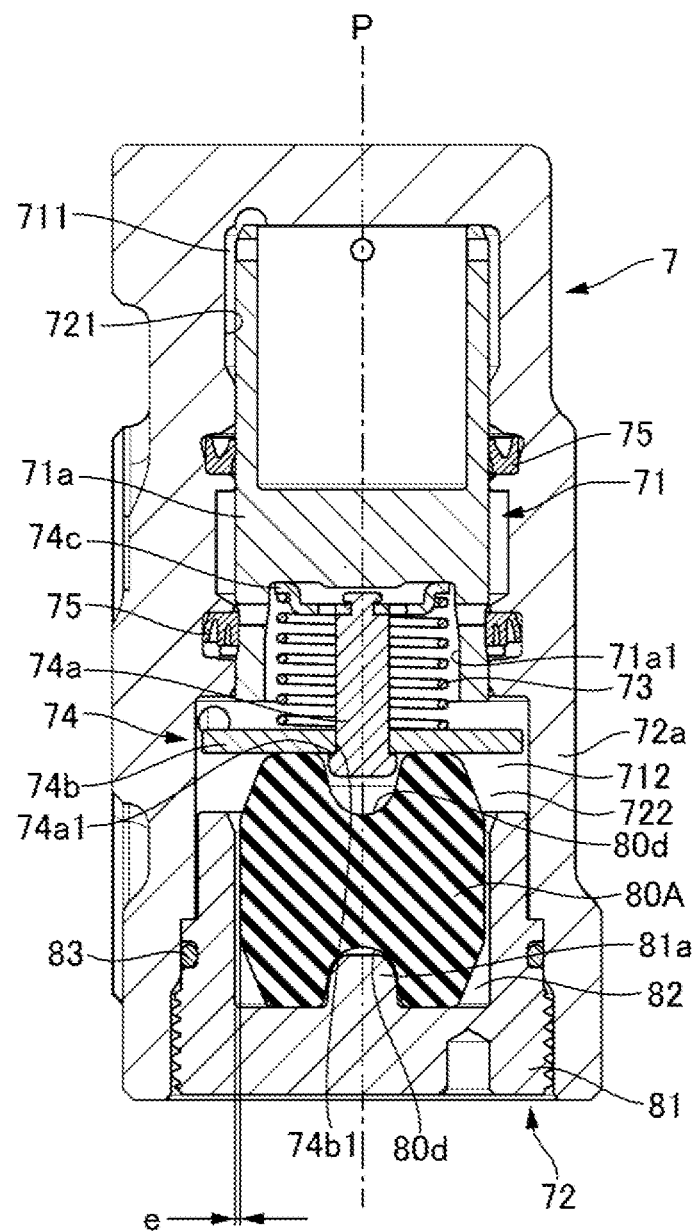
FIG. 16 is a partial cross-sectional view of the stroke simulator 7 according to a fourth embodiment.

FIG. 16 is a partial cross-sectional view of the stroke simulator 7 according to a fourth embodiment.

A rubber damper 80A has a solid shape unlike the second embodiment.

Further, the rubber damper 80A is positioned and held by forming a recessed portion 80d at each of the both end portions in the direction of the axis P and fitting one (the lower one as viewed in FIG. 16) of the recessed portions 80d to the protrusion portion 81a formed on the bottom surface of the rubber damper containing portion 82 of the plug 81.

The both end portions of the rubber damper 80A are in contact with the retainer 74b and the bottom surface of the rubber damper containing portion 82, respectively, and the outer peripheral surface of the shaft member 74a and the inner peripheral surface of the rubber damper containing portion 82 of the plug 81 are separated from the rubber damper 80A by a predetermined distance e and are out of contact therewith.

The other configuration is similar to the second embodiment, and therefore components shared with the second embodiment will be identified by the same reference numerals as the second embodiment and the descriptions thereof will be omitted below.

Figure 17:
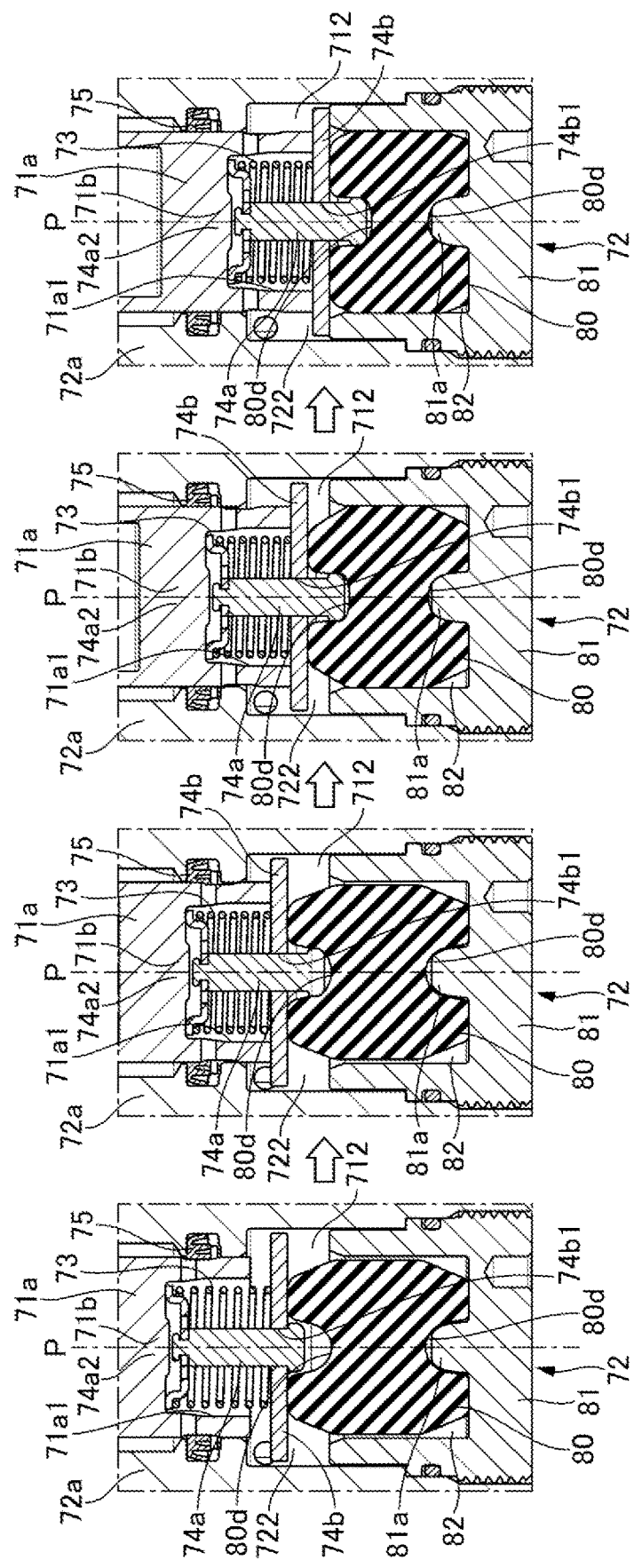
FIG. 17 is a cross-sectional view illustrating the operation of the stroke simulator 7 according to the fourth embodiment.

FIG. 17 is a cross-sectional view illustrating the operation of the stroke simulator 7 according to the fourth embodiment.

FIG. 17 illustrates the operation states of the initial state, the normal-use stroke region, the pressing latter-half stroke region, and the full stroke region from the left side thereof.

In the initial state and the normal-use stroke region (the stroke control region), the spring 73 having the small spring constant plays a main role to generate the reaction force by being compressed and deformed in the direction of the axis P according to the movement of the piston 71 in the direction of the axis P.

In the normal-use stroke region, due to the compression and deformation of the spring 73, the shaft member 74a of the stem 74 is separated from the retainer 74b of the stem 74 and further deeply enters and contacts the other recessed portion 80d (the upper one as viewed in FIG. 16) of the rubber damper 80A.

At this time, because the outer peripheral surface of the rubber damper 80A is out of contact with the inner peripheral surface of the rubber damper containing portion 82 of the plug 81, and the range where the rubber damper 80A is in contact with the retainer 74b and the plug 81 is also small, the occurrence of friction can be reduced and a smooth pedal feeling with low hysteresis can be acquired due to the compression and deformation mainly occurring on the spring 73.

Next, when the stroke simulator 7 enters the pressing latter-half stroke region (the pressing force control region), due to the movement of the piston 71 in the direction of the axis P, the rubber damper 80A also starts being compressed and deformed in the direction of the axis P via the retainer 74b and the outer peripheral surface of the rubber damper 80A starts contacting the inner peripheral surface of the rubber damper containing portion 82 of the plug 81 along therewith.

As the stroke simulator 7 approaches the full stroke region (the pressing force control region), the rubber damper 80A is also further largely compressed and deformed in the direction of the axis P, and the outer peripheral surface of the rubber damper 80A widely contacts the inner peripheral surface of the rubber damper containing portion 82 of the plug 81 and the shaft member 74a of the stem 74 also considerably compresses and deforms the recessed portion 80d along therewith. Then, the rubber damper 80A is further restricted from being radially deformed and the friction (the hysteresis) gradually increases. As a result, a spring-like feeling reduces and a further natural pedal feeling can be acquired.

Next, the functions and advantageous effects will be described.

The stroke simulator and the brake control apparatus according to the fourth embodiment fulfill functions and advantageous effects similar to the second embodiment.

Fifth Embodiment

Figure 18:
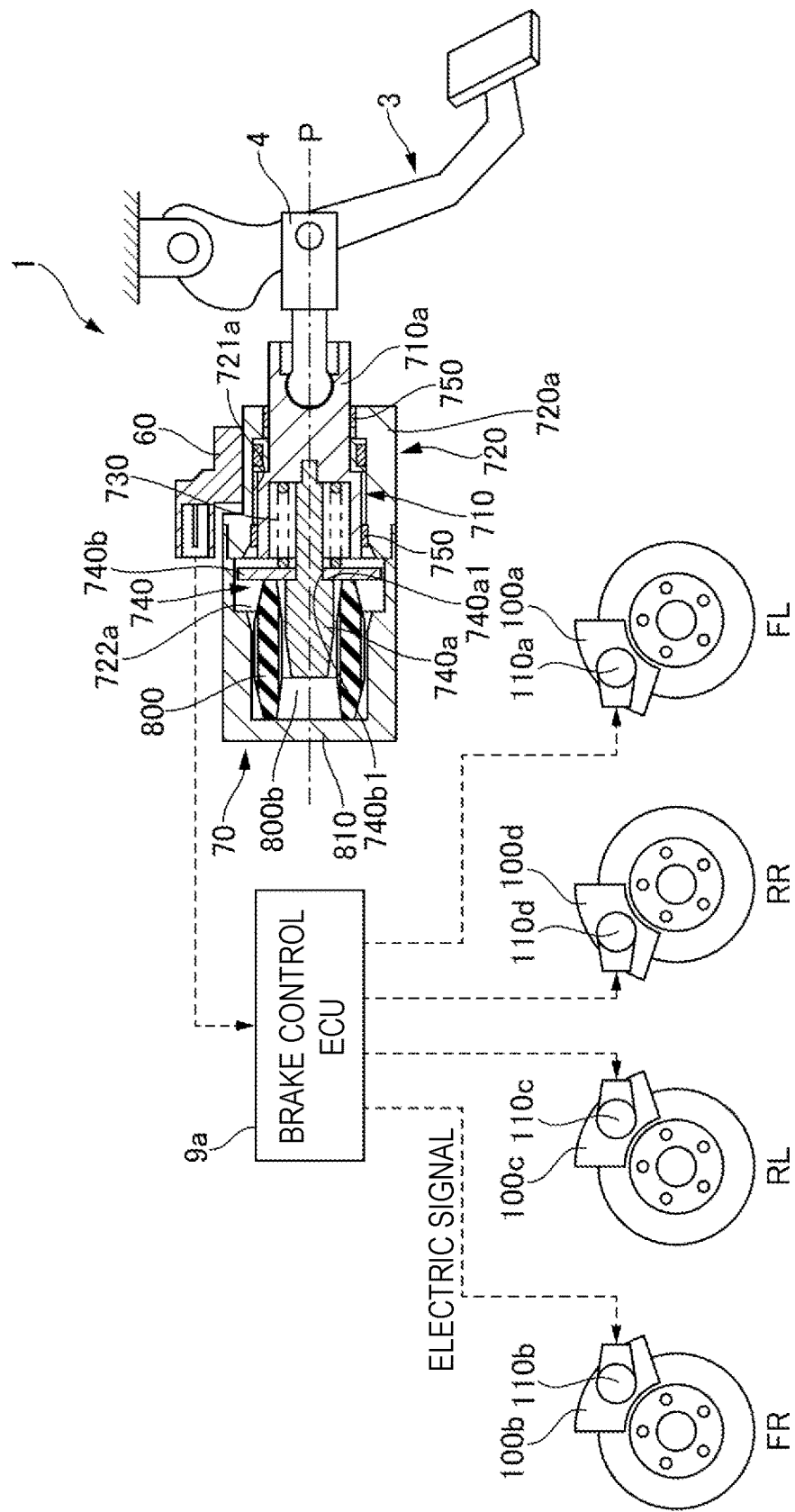
FIG. 18 illustrates the configuration of the brake control apparatus 1 according to a fifth embodiment.

FIG. 18 illustrates the configuration of the brake control apparatus 1 according to a fifth embodiment.

The first to fourth embodiments are applied to the hydraulic brake control apparatus, but the fifth embodiment is applied to an electric brake control apparatus.

More specifically, a disk brake-type electric caliper 100 is disposed on each of the wheels. The electric caliper 100 generates a braking force by being driven by a motor 110 controlled by a control unit 9a based on pressing stroke information from the stroke sensor 60, which detects the pressing stroke of the brake pedal 3.

Further, a stroke simulator 70 is coupled with the push rod 4 of the brake pedal 3 instead of the master cylinder according to the first to fourth embodiments.

The push rod 4 of the brake pedal 3 is coupled with a piston main body 710a.

The stroke simulator 70 includes a cylinder 720, a piston 710, a spring 730, and a hollow-shaped rubber damper 800. The cylinder 720 includes a cylinder main body 720a having a cylindrical inner peripheral surface, and a plug 810. The piston 710 includes the piston main body 710a and a stem 740. The rubber damper 800 serves as the elastic member and has a hollow shape.

The plug 810 forms the cylinder 720 by being threadedly engaged with the opening end of the cylinder main body 720a.

Further, the stem 740 includes a shaft member 740a and a retainer 740b. The shaft member 740a is inserted in a hole 740b1 of the retainer 740b.

The retainer 740b is movable in the direction of the axis P relative to the shaft member 740a.

The cylinder main body 720a includes a containing portion 721a, which contains the piston main body 710a.

The plug 810 includes a containing portion 722a, which contains the stem 740 and the rubber damper 800.

Two guide members (bushes, thrust bearings, or the like) 750, which smoothly support the axial movement of the piston, are mounted on the outer periphery of the piston 710. The guide members 750 are in contact with the inner peripheral surface of the containing portion 721a, and seal between the inner peripheral surface of the containing portion 721 and the outer peripheral surface of the piston main body 710a.

The spring 730 is a compression coil spring, and biases the piston main body 710a toward the push rod 4. The spring 730 generates the reaction force according to the compression amount.

The spring 730 is disposed between the piston main body 710a and the retainer 740b of the stem 740.

The retainer 740b of the stem 740 subjected to the biasing force of the spring 730 is engaged with a stepped portion 740a1 of the shaft member 740a fixed to the piston main body 710a, thereby being restricted from moving more than that.

The rubber damper 800 is inserted in a containing portion 820 formed in the plug 810 with the outer peripheral surface of the rubber damper 800 in pressure contact with the inner peripheral surface of the containing portion 820, and is disposed between the retainer 740b of the stem 740 and the plug 810. The rubber damper 800 also generates the reaction force according to the compression amount.

The rubber damper 800 is in pressure contact with the inner peripheral surface of the containing portion 820, thereby being positioned and held there. The outer peripheral surface of the shaft member 740a of the stem 740 inserted in a through-hole 800b of the rubber damper 800 is separated from the inner peripheral surface of the through-hole 800b by a predetermined distance and is out of contact therewith.

Therefore, the spring 730 and the rubber damper 800 are arranged in series via the retainer 740b between the piston main body 710a and the plug 810.

The spring constant of the spring 730 is significantly small compared to the spring constant of the rubber damper 800.

Due to this configuration, the stroke simulator 70 is actuated according to the driver's brake operation, and provides the reaction force and the stroke to the brake pedal 3.

Next, the functions and advantageous effects will be described. (1) In the electric brake control apparatus, the stroke simulator 70 is configured in the following manner. The piston 710 includes the piston main body 710a and the stem 740. The piston main body 710a is contained movably in the direction of the axis P of the cylinder 720, which includes the cylinder main body 720a and the plug 810. The piston main body 710a is coupled with the push rod 4 of the brake pedal 3. The shaft member 740a of the stem 740 of the piston 710 is inserted in the through-hole 800b of the rubber damper 800 in a non-contact state. Due to the movement of the piston 710 in the direction of the axis P, the spring 730 and the rubber damper 800 are compressed. When the movement of the piston 710 exceeds the predetermined stroke (between the pressing latter-half stroke region and the full stroke region), the inner peripheral surface of the through-hole 800b of the rubber damper 800 and the outer peripheral surface of the shaft member 740a of the stem 740 start contacting each other, by which the rubber damper 800 is restricted from being radially deformed.

Therefore, the electric brake control apparatus can also bring about the following advantageous effect similarly to the first embodiment. In the region where the stroke simulator 70 does not exceed the predetermined stroke, the inner peripheral surface of the through-hole 800b of the rubber damper 800 is out of contact with the outer peripheral surface of the shaft member 740a of the stem 740, and the range where the rubber damper 800 is in contact with the retainer 740b and the plug 810 is also small, so that the occurrence of friction can be reduced and a smooth pedal feeling with low hysteresis can be acquired due to the compression and deformation mainly occurring on the spring 730. Along therewith, in the region where the stroke simulator 7 exceeds the predetermined stroke, the rubber damper 800 is also largely compressed and deformed in the direction of the axis P, and the inner peripheral surface of the through-hole 800b of the rubber damper 800 and the outer peripheral surface of the shaft member 740a of the stem 740 start contacting each other. Then, the rubber damper 800 is restricted from being radially deformed and the friction (the hysteresis) gradually increases. As a result, a spring-like feeling reduces and a further natural pedal feeling can be acquired.

Other Embodiments

Having described the embodiments for implementing the present invention, the specific configuration of the present invention is not limited to the configurations of the embodiments, and the present invention also includes a design modification and the like thereof made within a range that does not depart from the spirit of the present invention, if any.

In the following description, technical ideas recognizable from the above-described embodiments will be described.

A stroke simulator, according to one configuration thereof, includes a piston contained in the cylinder movably in a direction of an axis of a cylinder, and an elastic member disposed in the cylinder so as to be compressed according to a movement of the piston and restricted from being deformed in a radial direction of the cylinder when the movement of the piston exceeds a predetermined stroke.

According to a further preferable configuration, in the above-described configuration, the elastic member is out of contact with an outer peripheral surface of the piston until the movement of the piston reaches the predetermined stroke, and is brought into contact with the outer peripheral surface of the piston when the movement of the piston exceeds the predetermined stroke.

According to another preferable configuration, in any of the above-described configurations, the elastic member has a hollow shape.

According to a further preferable configuration, in the above-described configuration, the piston includes a piston main body and a stem, and the stem is inserted in an inner periphery of the elastic member.

According to further another preferable configuration, in any of the above-described configurations, the elastic member is out of contact with an inner peripheral surface of the cylinder until the movement of the piston reaches the predetermined stroke, and is brought into contact with the inner peripheral surface of the cylinder when the movement of the piston exceeds the predetermined stroke.

According to a further preferable configuration, in the above-described configuration, the cylinder includes a cylinder main body and a plug, and the elastic member is held at a protrusion portion provided on a bottom surface of the plug.

According to further another preferable configuration, in any of the above-described configurations, the elastic member has a hollow shape.

According to a further preferable configuration, in the above-described configuration, the piston includes a piston main body and a stem, and the stem is inserted in an inner periphery of the elastic member.

According to a further preferable configuration, in the above-described configuration, a groove is formed on the inner periphery of the elastic member.

According to further another preferable configuration, in any of the above-described configurations, a groove is formed on an outer periphery of the elastic member.

According to further another preferable configuration, in any of the above-described configurations, the elastic member is formed symmetrically in the direction of the axis.

According to further another preferable configuration, in any of the above-described configurations, the piston includes a piston main body and a stem coupled with this piston main body.

According to a further preferable configuration, in the above-described configuration, the stem is coupled with the piston main body by press-fitting or threaded engagement.

A brake control apparatus, according to one configuration thereof, includes a stroke simulator configured to generate an operation reaction force of a brake pedal. The stroke simulator includes a cylinder, a piston contained in the cylinder movably in a direction of an axis of the cylinder, and an elastic member disposed in the cylinder so as to be compressed according to a movement of the piston and restricted from being deformed in a radial direction of the cylinder when the movement of the piston exceeds a predetermined stroke.

According to a further preferable configuration, in the above-described configuration, the second chamber is connected to a fluid passage connected to a braking force application portion configured to apply a braking force to a wheel.

According to further another preferable configuration, in any of the above-described configurations, the piston is coupled with an operation rod coupled with the brake pedal.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-173748 filed on Sep. 18, 2018. The entire disclosure of Japanese Patent Application No. 2018-173748 filed on Sep. 18, 2018 including the specification, the claims, the drawings, and the abstract is incorporated herein by reference in its entirety.

REFERENCE SIGNS LIST 1 brake control apparatus
2 wheel cylinder (braking force application portion)

100 electric caliper (braking force application portion)
4 push rod (operation rod)
5 master cylinder
7 stroke simulator
11 fluid passage (connected to the braking force application portion)
70 stroke simulator
71 piston
710 piston
71a piston main body (piston)
710a piston main body (piston)
711 positive-pressure chamber (first chamber)
712 back-pressure chamber (second chamber)
72 cylinder
72a cylinder main body (cylinder)
720 cylinder
720a cylinder main body (cylinder)
74 stem (piston)
74a shaft member (stem)
74b retainer (stem)
740 stem (piston)
740a shaft member (stem)
740b retainer (stem)
80 rubber damper (elastic member)
80A rubber damper (elastic member)
80a outer peripheral groove
80b through-hole
80c inner peripheral groove
800 rubber damper (elastic member)
81 plug (cylinder)
81a protrusion portion
810 plug (cylinder)

The invention claimed is:

1. A stroke simulator configured to generate an operation reaction force of a brake pedal, the stroke simulator comprising:
a cylinder;
a piston contained in the cylinder movably in a direction of an axis of the cylinder; and
an elastic member disposed in the cylinder so as to be compressed according to a movement of the piston and restricted from being deformed in a radial direction of the cylinder when the movement of the piston exceeds a predetermined stroke,
wherein the elastic member has a hollow shape,
wherein the piston includes a piston main body and a stem, and
wherein the stem is inserted in an inner periphery of the elastic member, and
wherein a groove is formed on the inner periphery of the elastic member.

2. The stroke simulator according to claim 1, wherein the elastic member is out of contact with an inner peripheral surface of the cylinder until the movement of the piston reaches the predetermined stroke, and is brought into contact with the inner peripheral surface of the cylinder when the movement of the piston exceeds the predetermined stroke.

3. The stroke simulator according to claim 2, wherein the cylinder includes a cylinder main body and a plug, and
wherein the elastic member is held at a protrusion portion provided on a bottom surface of the plug.

4. The stroke simulator according to claim 1, wherein the piston includes the piston main body and the stem coupled with this piston main body.

5. The stroke simulator according to claim 4, wherein the stem is coupled with the piston main body by press-fitting or threaded engagement.

6. The stroke simulator according to claim 1, wherein the elastic member is formed symmetrically in the direction of the axis.

7. A brake control apparatus comprising:
a stroke simulator configured to generate an operation reaction force of a brake pedal,
the stroke simulator including
a cylinder,
a piston contained in the cylinder movably in a direction of an axis of the cylinder, and
an elastic member disposed in the cylinder so as to be compressed according to a movement of the piston and restricted from being deformed in a radial direction of the cylinder when the movement of the piston exceeds a predetermined stroke
wherein the elastic member has a hollow shape,
wherein the piston includes a piston main body and a stem, and
wherein the stem is inserted in an inner periphery of the elastic member, and
wherein a groove is formed on the inner periphery of the elastic member.

8. The brake control apparatus according to claim 7, further comprising a master cylinder connected to the stroke simulator,
wherein the cylinder includes a first chamber and a second chamber separated by the piston, and
wherein the first chamber is connected to the master cylinder, and the elastic member is disposed in the second chamber.

9. The brake control apparatus according to claim 8, wherein the second chamber is connected to a fluid passage connected to a braking force application portion configured to apply a braking force to a wheel.

10. The brake control apparatus according to claim 7, wherein the piston is coupled with an operation rod coupled with the brake pedal.

11. A stroke simulator configured to generate an operation reaction force of a brake pedal, the stroke simulator comprising:
a cylinder;
a piston contained in the cylinder movably in a direction of an axis of the cylinder; and
an elastic member disposed in the cylinder so as to be compressed according to a movement of the piston and restricted from being deformed in a radial direction of the cylinder when the movement of the piston exceeds a predetermined stroke,
wherein the elastic member has a hollow shape,
wherein the elastic member has a through-hole,
wherein the piston includes a piston main body and a stem, and
wherein a shaft member of the stem of the piston is inserted in the through-hole of the elastic member, and
wherein inner peripheral surface of the through-hole of the elastic member is out of contact with an outer peripheral surface of the shaft member of the stem of the piston until the movement of the piston reaches the predetermined stroke, and is brought into contact with the outer peripheral surface of the shaft member of the stem of the piston when the movement of the piston exceeds the predetermined stroke.

12. A stroke simulator configured to generate an operation reaction force of a brake pedal, the stroke simulator comprising:
a cylinder;

a piston contained in the cylinder movably in a direction of an axis of the cylinder; and an elastic member disposed in the cylinder so as to be compressed according to a movement of the piston and restricted from being deformed in a radial direction of the cylinder when the movement of the piston exceeds a predetermined stroke, wherein the elastic member has a hollow shape, wherein the piston includes a piston main body and a stem, wherein the stem is inserted in an inner periphery of the elastic member, and wherein a groove is formed on an outer periphery of the elastic member.

* * * * *